Jan. 30, 1968 E. W. MALONE ETAL 3,366,881

PULSE-TIME MODULATION SYSTEM WITH CONVERSION TO PULSE-WIDTH MODULATION AT RECEIVER

Filed July 31, 1964 2 Sheets-Sheet 1

INVENTORS.
ERLE W. MALONE
DONALD J. SOMMER
HOWARD F. CLARKE
WILLIAM G. SHEPARD

Reynolds & Christensen
ATTORNEYS

Jan. 30, 1968 E. W. MALONE ETAL 3,366,881

PULSE-TIME MODULATION SYSTEM WITH CONVERSION TO PULSE-WIDTH MODULATION AT RECEIVER

Filed July 31, 1964 2 Sheets-Sheet 2

INVENTORS.
ERLE W. MALONE
DONALD J. SOMMER
HOWARD F. CLARKE
WILLIAM G. SHEPARD

Reynolds & Christensen
ATTORNEYS

United States Patent Office 3,366,881
Patented Jan. 30, 1968

3,366,881

PULSE-TIME MODULATION SYSTEM WITH CONVERSION TO PULSE-WIDTH MODULATION AT RECEIVER

Erle W. Malone, Donald J. Sommer, Howard F. Clarke, and William G. Shepard, Seattle, Wash., assignors to The Boeing Company, Seattle, Wash., a corporation of Delaware Filed July 31, 1964, Ser. No. 386,682
14 Claims. (Cl. 325—38)

ABSTRACT OF THE DISCLOSURE

A pulse code transmitter and receiver are disclosed which make use of true pulse-position modulation of a radio transmitter with the separation of each pulse in a substantially continuous train of pulses carrying the transmitted information. No time marker pulses are required and through the use of a voltage controlled pulse generator operating at periodic time intervals to provide output signals of constant width the energy requirements for the transmitter are reduced to a point such that extremely compact transmitter arrangements are made possible in the system. The operation is such that the radio frequency transmitter in the receiver is quiescent or nontransmitting during the major portion of the information transmitting period. A simplified receiving system cooperates with the transmitter in a manner such that timing pulses are not required in the transmitted pulse train.

The present invention relates to communication systems and more particularly to an improved pulse communication system and components adapted to generate, transmit, and receive information utilizing novel concepts for reducing the amount of power required for the transmission of information and also for reducing the effects of noise.

In many present day activities it is necessary to obtain information from a given area and transmit such information for analysis at a location displaced therefrom. Various types of telemetry systems have been devised making use of wireless communication techniques and equipment, and in general an attempt has been made to provide compact, efficient equipment which requires very little energy from the power supply associated therewith. One example wherein the size and efficiency of the transmission equipment is of great importance is in the field of obtaining physiological measurements from a human being working in an environment wherein it is impractical or impossible to utilize direct wire communication equipment. In order to reduce to a minimum the encumbrance to the subject caused by the various sensing elements and associated radio frequency transmitters for transmitting the sensed data to a processing point, it is desirable to have the entire system, including the power supply, compact and yet able to operate for an extended period of time. Various types of pulse communication equipment have been developed for use in this and other telemetry applications, with the objective in each case being to provide a compact, efficient system which will transmit the desired information and remain relatively immune to noise signals.

It is therefore an object of the present invention to provide an improved communication system making use of components arranged in a manner such that the power requirements for the system are minimized.

A further object of the present invention is to provide a low-power transmitter adapted for use in an improved communication system making use of pulse techniques.

Another object of the present invention is to provide an improved low-power communication system including a transmitter which is compact in size and which makes use of pulse generating techniques for providing output signals having a linear correspondence with respect to the desired information signal.

A further object of the present invention is to provide an improved pulse communication system adapted for use in telemetry applications.

Another object of the present invention is to provide an improved receiving system for a pulse code communication system.

Another object of the present invention is to provide an improved receiver system for demodulating information carried by a pulse train as the time between adjacent pulses.

Another object of the present invention is to provide an improved pulse code transmitter responsive to the amplitude of an applied signal and adapted to provide output pulses of uniform width with the spacing between adjacent pulses being proportional to the amplitude of the applied signal, together with receiver means adapted to reconstruct at a remote point the information originally applied to the transmitter.

A further object of the present invention is to provide an improved pulse code communication system wherein information is transmitted as the variation in separation of adjacent pulses and wherein timing or marker pulses need not be transmitted.

Another object of the present invention is to provide an improved pulse code regenerator which does not require the receipt of separate timing pulses.

In accordance with the teachings of the present invention an improved pulse code transmitter is provided which makes use of a voltage controlled pulse generator adapted to provide at periodic time intervals a pulse having a constant width. An oscillator operating as a radio frequency transmitter is connected to the voltage controlled pulse generator in a manner such that high frequency radio frequency signals are transmitted in bursts for a time duration corresponding to the width of each of the pulses provided by the voltage controlled pulse generator. The voltage controlled pulse generator responds to an applied control signal in a manner such that the separation between adjacent pulses provided thereby is proportional to the amplitude of the control signal. An appropriate sensing element is coupled through an amplifier to the input of the voltage controlled pulse generator so that the separation of adjacent pulses from the pulse generator is proportional to the amplitude of the output signal from the sensor-amplifier arrangement. By making use of miniaturized components it is found that an extremely low-power pulse communication transmitter is provided. That is, the voltage controlled pulse generator is so constructed that during the major portion of each cycle of operation there is no output signal therefrom and thus there is little or no drain on the battery or other power supply utilized for providing electric energy for the transmitter. The radio frequency oscillator associated with the pulse generator operates to provide bursts of radio frequency energy only during the occurrence of a pulse from the pulse generator and therefore the transmitter is in a quiescent or nontransmitting condition during the major portion of the information transmitting period. By making use of an improved and simplified receiving system the transmitter is not required to transmit timing pulses and therefore further reductions in the amount of power required by the transmitter are achieved. It is found in practice that by making use of these techniques an extremely small transmitter capable of operating for an extended period of time on the energy of a small power supply is provided.

The receiving system provided in accordance with the teachings of the present invention makes use of a conventional radio frequency amplifier, detector, and video amplifier with these components being adapted to be responsive to the bursts of radio frequency energy from the transmitter and to provide in response thereto periodic pulses corresponding to the transmitted pulses. Since the system is operating on the basis of pulse code communication techniques a pulse width recognition logic arrangement is provided which filters out noise signals of a duration different from the width of the information pulses. The pulse width recognition logic is so constructed that adjacent ones of the transmitted pulses serve to generate corresponding output signals therefrom which are spaced in time in accordance with the spacing between the transmitted pulses. These signals are then applied to a second logic circuit network which for purpose of explanation is referred to as an expected time logic arrangement wherein each of the processed information signals serves to trigger a mono-stable multivibrator arrangement having an unstable condition corresponding to less than the minimum time between adjacent pulses generated by the voltage controlled pulse generator in the transmitting system. A system of gate circuits serves to close the input to the monostable circuitry once an information signal has been applied thereto. After a preselected and constant time interval the monostable circuitry reverts to its initial stable condition and at such time through the previously mentioned gating circuitry serves to permit the application of a subsequent information pulse to the monostable circuitry. When the subsequent information pulse is applied to the monostable circuitry the monostable circuitry again changes to its unstable condition and blocks the further application of pulses thereto. Thus the arrangement is such that the information signals serve to repeatedly trigger the monostable circuitry to its unstable condition for a period of time which is less than the minimum time interval between adjacent signals. Therefore the expected time logic circuitry provides a train of output pulse signals which consist of pulse signals of one polarity having a fixed time duration corresponding to the unstable condition of the monostable circuitry and a second series of pulse signals of opposite polarity having a duration which is proportional to the time between adjacent ones of the transmitted pulses. In a pulse code communication system such as that disclosed herein the time between adjacent pulses is proportional to the amplitude of the desired information signal and therefore it will be seen that the receiving system serves to in turn provide a reconstructed train of width modulated pulses each of which exists for a time which is proportional to the separation in time of the originally transmitted information pulses. These time or width modulated signals are then applied to a filter and output circuit which serves to provide at the output therefrom a signal which is amplitude modulated in proportion to the original amplitude modulation applied to the pulse generator in the transmitter. The signals thus provided by the filter may then be applied to a recorder or other suitable signal utilization system.

The above and additional objects and advantages of the present invention will be more clearly understood from the following description when read with reference to the accompanying drawings.

In the drawings FIGURE 1 is a block diagram of the improved pulse code transmitter adapted for use in the system of the present invention;

Figure 1:
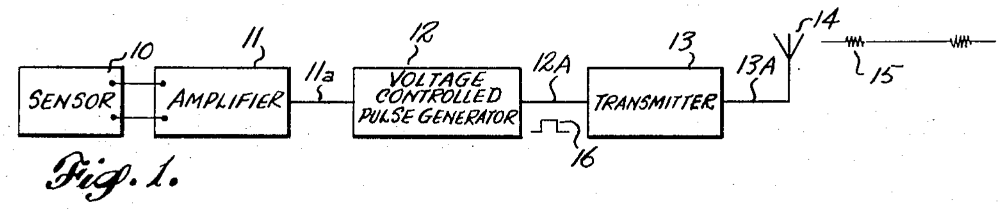
Figure 6:
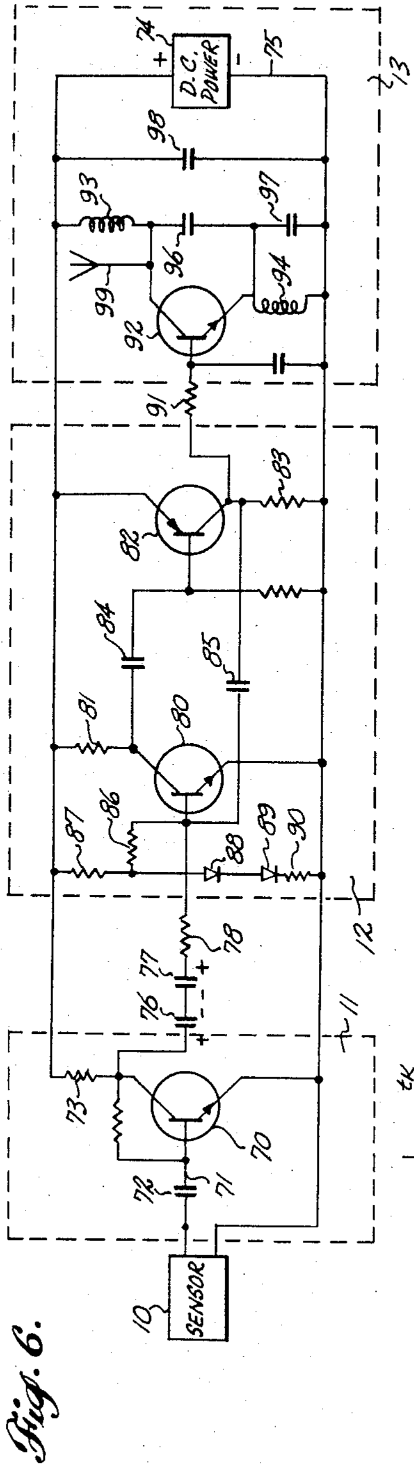
Figure 7:
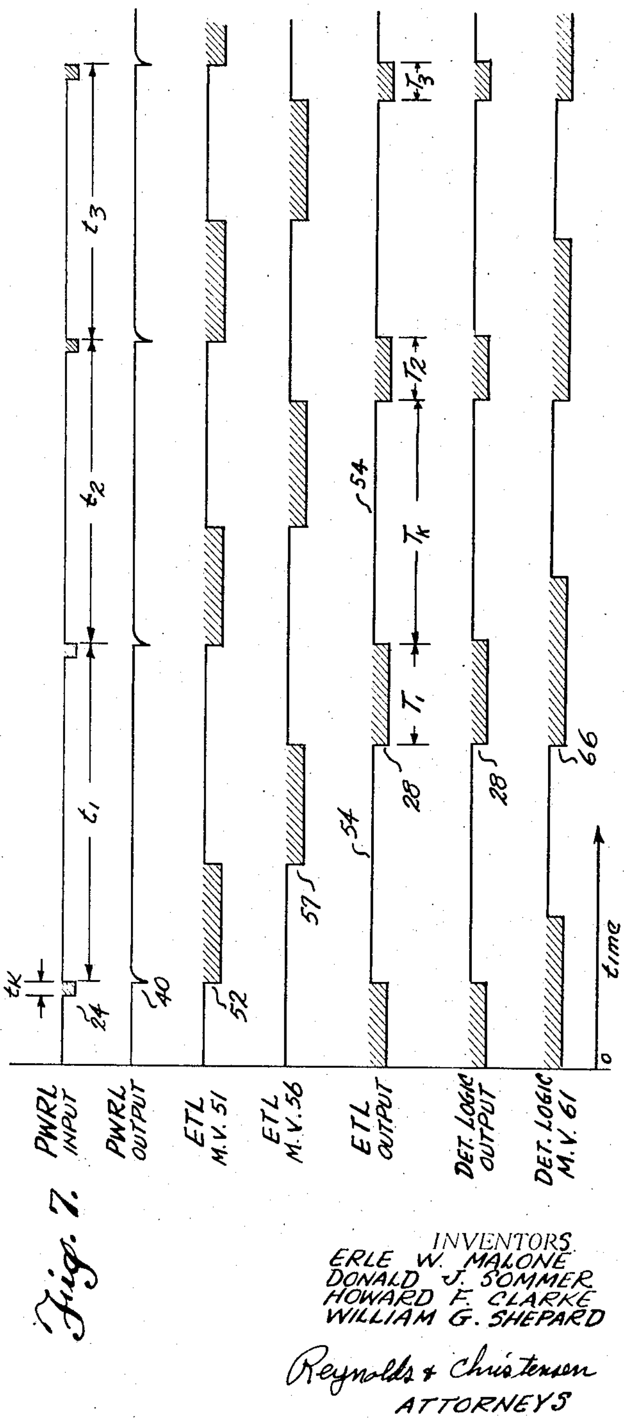

FIGURE 6 is a schematic circuit diagram illustrating in detail a specific transmitter corresponding in general to the transmitting system illustrated in block form in FIGURE 1; and FIGURE 7 is a diagram of various signals plotted as voltage versus time showing in detail the manner in which the time displaced constant width pulses from the transmitter are operated on by the receiver system of the present invention.

Referring now to the drawings and in particular to FIGURE 1 there is shown in block diagram form a preferred embodiment of the transmitter system adapted for use in the pulse communication system of the present invention. As previously stated, the invention finds particular use for transmitting information from a human being, as for example in transmitting signals proportional to the temperature or to the heartbeat of an individual. Thus for purpose of illustration the system in FIGURE 1 includes a sensor 10 coupled by a pair of signal output leads with a conventional amplifier 11. The amplifier 11 is preferably of a compact type such as, for example a conventional transistor amplifier having a signal output circuit 11*a* coupled with the input of a voltage controlled pulse generator 12. As described in detail hereinafter, the voltage controlled pulse generator 12 is adapted to periodically provide pulses of a constant width with the time between adjacent pulses being determined by the voltage on the output circuit 11*a* of the amplifier 11. The pulse generator 12 may be a free-running, astable multivibrator having a very short "on" condition and a relatively long "off" condition. While not necessary to the overall system concept of the present invention, one particular voltage controlled pulse generator described hereinafter and found to work well in the system was adapted to provide pulses having a two microsecond pulse width with a pulse occurring approximately every 220 microseconds. If the level of the voltage on the circuit 11*a* is increased the time between adjacent pulses from the pulse generator 12 is decreased by an amount proportional to the increase in voltage on the circuit 11*a*. Likewise if the voltage on the circuit 11*a* is decreased the time between adjacent pulses from the pulse generator 12 is increased. In all cases, however, the width of the pulses generated remains substantially constant with the width in one system having been chosen at 2 microseconds.

The voltage controlled pulse generator 12 has a signal output circuit 12*a* which serves as an input control circuit for a radio frequency oscillator which acts as a transmitter 13 having a signal output circuit 13*a* connected to a transmitting antenna 14. The arrangement is such that the transmitter 13 is normally in a nontransmitting condition so that it is not utilizing any substantial amount of power from the power supply which is used for energizing the components in FIGURE 1. Upon receipt of each of the two microsecond pulses from the pulse generator 12 the transmitter 13 serves to provide a burst of radio frequency energy indicated as the output signals 15 with adjacent ones of the output bursts of energy being separated in time by a period proportional to the amplitude of the signal provided by the amplifier 11 to the pulse generator 12. In the absence of one of the two microsecond pulses from the pulse generator 12 the transmitter 13 remains in its quiescent or "off" condition. As described in detail hereinafter, in one system constructed in accordance with the teachings of the present invention a single transistor Colpitts oscillator was used as the transmitter 13 and was constructed to operate at 60 megacycles per second.

Figure 2:
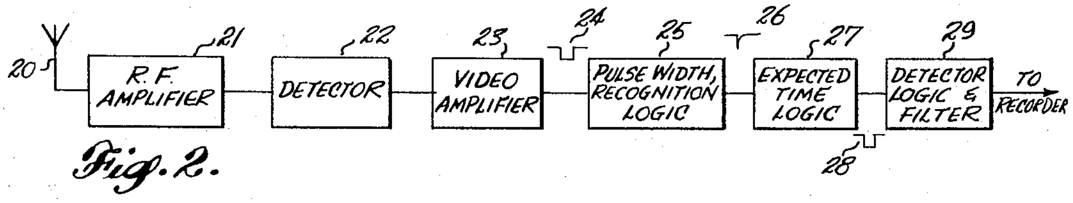
FIGURE 2 is a block diagram illustrating in general the various components of the receiver portion of the communication system of the present invention.

The communication system includes a receiver and decoding system illustrated generally in the block diagram of FIGURE 2. A receiving antenna 20 is adapted to receive the radio frequency energy transmitted by transmitter 13 and apply the same as an input signal to a receiver which may be a conventional wide band superheterodyne receiver including an RF section, a first detector, intermediate frequency amplifier, and second detector. For purpose of illustration an RF amplifier 21 is shown as connected to antenna 20 and to a conventional detector 22 which is in turn connected to a video amplifier 23. The video amplifier 23 serves to amplify signals in excess of a threshold level, set to exclude noise, and to clipped rectangular pulses 24 to the pulse width recognition circuit 25.

The pulse width recognition logic circuit 25 is adapted to interrogate each of the pulses 24 individually and reject those pulses which are not of a predetermined width. As previously set forth, in one preferred embodiment wherein the pulses 16 were of a width corresponding approximately to two microseconds the pulse width recognition logic circuit 25 was adapted to pass only those pulses having a width corresponding to this predetermined time interval. Those pulses which meet the criteria established by the logic in the circuit arrangement 25 cause the negative going signals 26 to be applied to an expected time logic circuit 27. The circuit 27 responds to pulses occurring within a selected pulse repetition period from a preceding pulse, as established by the pulse generator 12, plus or minus a small time deviation to allow for modulation, and in response thereto then provides rectangular pulses 28 having a width proportional to the separation of adjacent pulses 16 produced by the pulse generator 12 in the transmitter system. The two logic subassemblies 25 and 27 thus operate together to reject extraneous signals which have an appreciably different pulse width or recurrence period than the data pulses produced by the pulse generator 12 in the transmitting system, and to provide output information pulses having a duration proportional to the amplitude of the signal applied to the pulse generator 12. Since these signals 28 have a constant amplitude and a width which corresponds to the desired information, the average D.C. level over a period of time represents modulation intelligence.

The signals from the expected time logic network 27 are applied to the detector logic and filter network 29 which is in turn coupled with a utilization device such as a recorder. The detector logic and filter network 29 includes circuitry adapted to prevent misoperation of the system in the event a pulse in the train of pulses transmitted is not received by the radio frequency amplifier 21. That is, as described in detail hereinafter, the system provided in accordance with the present invention does not require the transmission of accurately spaced timing or "mark" pulses and therefore means is provided so that no substantial error occurs in the information provided to the recorder in the event a given pulse is not received by the amplifier 21.

Figure 3:
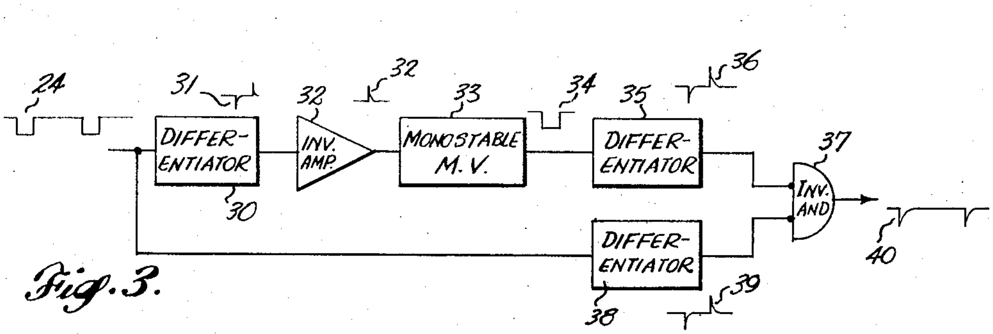
FIGURE 3 is a block diagram of the pulse width recognition logic network of the receiver system illustrated in FIGURE 2.

Referring now to FIGURE 3, further details of the pulse width recognition logic (PWRL) will be more clearly understood. It will be seen in FIGURE 3 that the PWRL includes a differentiating network 30 which is adapted to operate upon the negative going leading edge of the pulses 24 provided by the video amplifier 23. The differentiator 30 serves to provide a negative going differentiated pulse 31 to an inverting amplifier 32 which inverts and amplifies the signal 31 and provides a positive going triggering pulse 32 to a monostable multivibrator 33. The monostable multivibrator 33 is normally at a given quiescent condition and in response to the positive going pulse 32 serves to generate an output pulse 34 having a predetermined time width which corresponds to the width of the pulses generated by the voltage control pulse generator 12 in the transmitter. The pulses 34 are applied to a second differentiating network indicated as the differentiator 35 which operates upon the positive going trailing edge of the pulse 34 to provide a positive going pulse 36 to an inverting AND gate 37. The terminology inverting AND gate is meant to describe an AND gate which in response to the simultaneous occurrence of positive going signals at the inputs thereof provides a single negative going output pulse. Such gating circuits are well known in the art and per se form no part of the present invention. It will of course be obvious to those skilled in the art that different specific logic components can be utilized to obtain the advantages of the present invention, one specific set of components merely being shown for purpose of illustration and to teach the invention.

The pulse width recognition logic circuit shown in FIGURE 3 will be seen to include a third differentiating network shown as the differentiator 38 adapted to provide positive going pulses 39 on the output circuit thereof in response to the trailing positive going edge of an applied input pulse 24. Thus it will be seen that if the trailing edge of an applied pulse 24 corresponds in time to the trailing edge of the output pulse 34 from the monostable multivibrator 33 the signals 36 and 39 will be applied substantially simultaneously to the two input circuits of the inverting AND gate 37 and hence a negative going pulse 40 will be provided at the signal output circuit from the inverting AND gate 37. In practice the AND gate 37 is preferably of the type which permits approximately ½ microsecond variation in the occurrence of the pulses 36 and 39 and yet will provide its output pulse 40 in response thereto.

Figure 4:
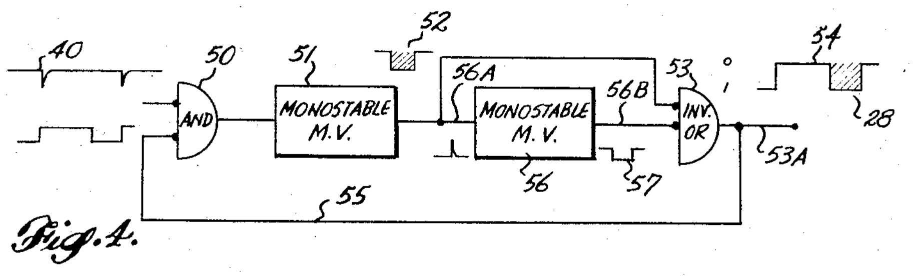
FIGURE 4 is a block diagram of the expected time logic network of the system of FIGURE 2.

The negative pulses 40 from the pulse width recognition logic network of FIGURE 3 are applied as an input to the AND gate 50 of the expected time logic network 27 shown in greater detail in FIGURE 4. Since the system of the present invention makes use of nonlinear pulse techniques operating on the well known binary code, reference will be made to the signal level at the output circuit of the expected time logic network 27 as being either in the zero or the 1 condition. When a pulse 40 passes through the AND gate 50 a first monostable multivibrator 51 in the ETL network is triggered from its stable condition to its unstable condition and as a result thereof provides a first negative going rectangular pulse 52 to one of the two inputs of the inverting OR gate 53 which serves as the output gate for the ETL network. The OR gate 53 in the embodiment illustrated is of the inverting type which in the absence of a negative going signal has its output terminal 53 maintained at a given negative potential identified as the "1" level. When the pulse 52 is applied thereto the output circuit 53A rises to a given voltage level indicated by the pulse 54 as being at the zero level. The output circuit 53A from the inverting OR gate 53 will be seen to be connected by the feedback loop 55 as an input for the negative AND gate 50 with the arrangement being such that the AND gate 50 is opened when each of its two input circuits has a negative signal applied thereto. Thus it will be seen that with the inverting OR gate at a negative level in the absence of a negative signal applied thereto the AND gate 50 will be conditioned for the receipt and passage of a first negative going pulse 40 from the pulse width recognition logic network. However as soon as the pulse 52 from the first monostable multivibrator 51 is applied to the inverting OR gate 53 the output terminal 53A thereof rises to its zero level and hence the AND gate 50 is disabled and will not pass further negative pulses applied to its second input terminal. Thus noise and other extraneous signal information which normally cause disruption of overall system operation are eliminated.

The expected time logic network of FIGURE 3 will be seen to further include a second monostable multivibrator 56 having its signal input circuit 56A connected to the output circuit of the first monostable multivibrator 51 and its output circuit 56B connected as an input to the inverting OR gate 53. The second monostable multivibrator 56 is responsive to the trailing positive going edge of the pulse 52 from the first monostable multivibrator 51 to be triggered to its unstable condition and provide a second negative pulse 57 to the inverting OR gate 53. The arrangement is such that when the first multivibrator 51 starts to return to its stable condition the second monostable multivibrator 56 is triggered to its unstable condition where it remains for the duration of its output pulse 57. Hence the inverting OR gate 53 remains in its zero condition for a time corresponding to the sum of the time of the duration of the two pulses 52 and 57. While a single monostable multivibrator might be used for controlling the duration of the inverting OR gate being in its zero condition, it is found in practice that a single monostable multivibrator requires a given length of time to completely recover from its unstable condition back to the condition wherein it will be retriggered by an appropriate control signal. To avoid the uncertainties associated with the recovery time of a single monostable multivibrator, two multivibrators connected in the arrangement shown in FIGURE 4 are utilized. Thus it will be seen that during the time when the second multivibrator 56 is providing its output pulse 57 the first multivibrator 51 is allowed to recover. Therefore, substantially immediately upon termination of the pulse 57 from the second multivibrator 56 the AND gate 50 is reenabled and the first multivibrator 51 is in a condition for triggering by a subsequent one of the applied negative going pulses 40. The net result of the operation is that the level of the output of OR gate is at the zero level, which appears as a positive pulse 54, for a time which remains a constant and is very accurately determined. Therefore, as described hereinafter, the system provides accurate regeneration of the information transmitted by the transmitting system illustrated in FIGURE 1.

In practice the duration of the positive pulse 54 (or zero condition of the OR gate output) is selected to be less than the time between adjacent pulses from the pulse generator 12 in the transmitting system of FIGURE 1 when the voltage level of the output circuit *11a* from the amplifier 11 is at the lowest voltage to be monitored. Therefore it will be seen in FIGURE 4 that a signal which appears as the negative going rectangular pulse 28 will be provided on the signal output circuit 53A of the inverting OR gate 53 with the width of the pulse 28 being equal to the difference between the total time lapse between adjacent pulses 40 and the constant time interval of the positive pulse 54. Since the duration of the positive pulse 54 remains constant, it will be seen that the duration of the pulse 28 is proportional to the time between adjacent ones of the pulses 40. Since the time between adjacent pulses 40 is in turn proportional to and in fact substantially identical to the time between adjacent ones of the pulses generated by the voltage controlled pulse generator 12 of FIGURE 1, it will be seen that the width of the pulses 28 depends on and is proportional to the amplitude of the signal applied to the voltage controlled pulse generator 12. Accordingly, the system thus far described will be seen to provide an improved method for the transmission and receipt of information without the requirement for the transmission of accurately spaced timing or marker pulses.

The pulses 28 are of constant amplitude and variable width and therefore can be applied to any of a number of conventional pulse width demodulation circuits, as for example a conventional filter network which is adapted to provide an output signal having a level corresponding to the average amplitude of the pulses applied thereto.

Figure 5:
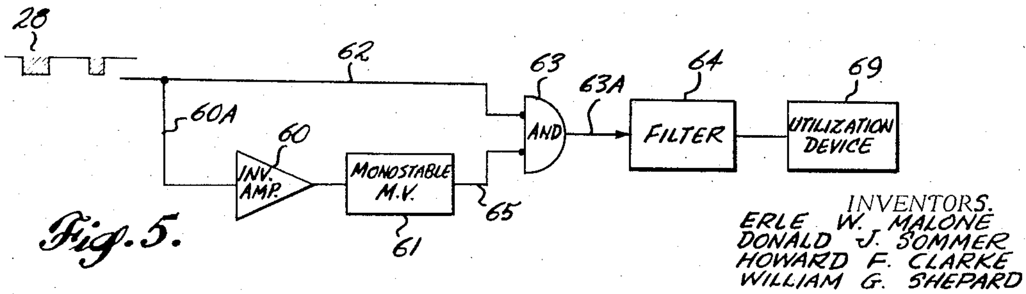
FIGURE 5 is a block diagram showing in greater detail the detector logic and filter network of the system of FIGURE 2.

While the system thus far described is found to work well, in practice the detector logic network illustrated with greater particularity in FIGURE 5 is included in the system to prevent fluctuations in the output signal which might be caused should one of the transmitted bursts of radio frequency energy not be received by the radio frequency amplifier 21. As is well known in the art, this can of course happen due to various types of interference or changes in atmospheric conditions. As seen in FIGURE 5, the negative going rectangular pulses 28 are applied to the input circuit 60A of an inverting amplifier 60 which is in turn coupled with the input circuit of a monostable multivibrator 61. The monostable multivibrator 61 is selected to have an unstable condition which continues for a time slightly longer than the maximum variation in time between the pulses generated by the voltage controlled pulse generator 12. That is, the duration of the unstable condition of the multivibrator 61 is made to exceed the maximum width of any pulses 28 which might be applied to the detector logic network illustrated in FIGURE 5. The negative going rectangular pulses 28 will be seen to be applied over the circuit 62 as one of the two inputs to a conventional AND gate 63 having a signal output circuit 63A connected to a filter network 64. The second input for the AND gate 63 is the circuit 65 which is coupled with the output circuit of the monostable multivibrator 61. The arrangement is such that the leading negative going edge of a pulse 28 applied through the inverting amplifier 60 serves to trigger the monostable multivibrator 61 to its unstable condition so that the negative gate signal 66 is applied to the AND gate 63. At the same time the leading edge of the pulse 28 is applied directly over the lead 62 to the other input of the AND gate 63 and hence a corresponding signal is applied over the circuit 63A to the filter network 64. When the applied pulse 28 terminates the AND gate 63 will be closed and the pulse applied to the filter 64 will terminate even though at that time the monostable multivibrator 61 remains in its unstable condition and continues to apply its negative signal 66 as an input to the AND gate 63. Thus it will be seen that the width of a pulse 28 determines the time that the gate 63 is open and hence determines the width of the pulse applied to the filter network 64.

In the event one of the pulses 28 does not terminate after an extended period of time which would exceed the normal maximum width of such pulses, the termination of the pulse 66 from the multivibrator 61 would serve to close the gate 63 and prevent the application of a protracted error signal to the filter network 64. It should be noted from FIGURE 4 that the pulse 28 is terminated in response to the receipt of a subsequent pulse 40 and therefore should one of the pulses 40 not be applied to the pulse width recognition logic network, the output information pulse 28 would continue until a following pulse 40 was received. The detector logic network of FIGURE 5 serves to prevent a protracted error in the output if this should occur. The filter network 64 will be seen to be connected to a utilization device shown generally at 69 and which can be any of a number of devices well known in the art, as for example a conventional strip recorder.

While various components well known in the art can be used for constructing a system such as that illustrated and described above, there is shown in FIGURE 6 a schematic circuit diagram of one transmitter constructed in accordance with the teachings of FIGURE 1. Referring now to FIGURE 6 it will be seen that the amplifier 11 of FIGURE 1 is a conventional resistance coupled transistor amplifier making use of an NPN transistor 70 having its base 71 coupled by the capacitor 72 to the sensor 10. In the embodiment illustrated in FIGURE 6 the sensing member 10 is adapted to sense the heartbeat of a human and in response thereto to provide varying signals through the capacitors 72 to the base of the transistor 70. It will be seen that the collector-emitter circuit of the transistor 70 is connected through the resistor 73 to the positive terminal of a D.C. power supply 74 with the emitter of the transistor 70 being directly connected to the negative terminal 75 of the D.C. power supply 74. The collector resistor 73 is made relatively large, in order of one megohm, to stabilize the bias on transistor 70 and at the same time reduce the overall power required from the battery 74. The output circuit from the amplifier 11 includes a pair of coupling capacitors 76 and 77 connected in series circuit with each other and with an impedance element shown as a resistor 78. The capacitors 76 and 77 are preferably tantalum capacitors connected in a back-to-back relationship to allow signal polarity reversal without excessive leakage.

The information signals as amplified by the transistor 70 are applied to the voltage controlled pulse generator 12 which will be seen in FIGURE 6 to include an NPN transistor 80 having its emitter directly connected to the negative terminal of the battery and its collector connected through the resistor 81 to the positive terminal of the battery, together with a PNP transistor 82 having its emitter directly connected to the positive terminal of the battery and its collector connected through the resistor 83 to the negative terminal of the battery. The cross coupling capacitors 84 and 85 serve to respectively connect the collector of transistor 80 to the base of transistor 82 and the collector of transistor 82 to the base of transistor 80. Full positive feedback is thus achieved and serves to produce oscillation of the circuit. Due to the complementary symmetry of the circuit the current through the two transistors 80 and 82 rises and falls together with the result being that an astable system is provided which oscillates between the two conditions when the loop gain drops below 1. This occurs whenever both transistors are saturated or when both transistors are cut off. With the arrangement illustrated in FIGURE 6 a considerable saving in power is obtained since the transistors are turned off most of the time and yet when they are turned on they draw sufficient collector current to place them in the region of good high frequency characteristics. With the arrangement of FIGURE 6 the saturated condition of the transistors determines the individual pulse width and the cut-off condition determines the off time of the transistors. In one embodiment of the invention constructed in accordance with the teachings hereof the "on" time of the transistors was made very small, in the order of two microseconds, while the "off" time was chosen to give a pulse repetition rate of approximately 5,000 pulses per second.

It will be seen that the base of transistor 80 is directly connected through resistor 78 and the capacitors 76 and 77 to the collector of the transistor 70 and also through the resistors 86 and 87 to the positive terminal of the power supply 74. Since temperature normally affects the voltage level required to bias a transistor into its conducting condition, changes in temperature might tend to cause changes in the repetition rate of the pulse generator 12. To compensate for such temperature effects, the bias of the first transistor 80 in the pulse generator is developed through the two forwardly biased diodes 88 and 89 connected in series circuit with the resistor 90 between the junction of resistors 86 and 87 and the negative terminal of the power supply 74. The diodes 88 and 89 are of the solid-state type and are found to undergo a change in their forward voltage drop which is a function of temperature. The change in the forward voltage drop across the diodes thus compensates for the temperature effects which might occur and impair the operation of the pulse generator.

At the end of the time when the two transistors 80 and 82 have been fully conductive the capacitor 85 is charged to a potential which is substantially equal to that of the power supply. To this potential is added or subtracted the amplified signal from the amplifier 11. When the pulse generator returns to its "off" condition with the two transistors 80 and 82 nonconductive, the time required to cause reconduction of the transistors is determined by the capacitors discharging through their associated resistors since at this time the transistors are nonconductive. The result is that the increment of voltage added to or subtracted from the potential on the capacitor 85 at the start of the "off" period will alter the "off" period by an amount proportional to said voltage increment. It is found in practice that the time between adjacent pulses provided in the output circuit from the pulse generator 12 is directly proportional to the voltage applied to the base of transistor 80 and hence to the capacitor 85.

The collector of the transistor 82 will be seen to be directly connected through the resistor 91 to the base of a transistor 92 shown for purpose of illustration as an NPN transistor connected in a pulsed Colpitts oscillator circuit arrangement which is turned on by the pulses from the pulse generator 12. It will be seen that the collector of the transistor 92 is connected through a first inductor 93 to the positive terminal of the power supply 74 and the emitter of the transistor is connected through a second inductor 94 to the negative terminal of the power supply 75. A capacitor 96 connected between the collector and emitter of the transistor 92 provides positive feedback to produce the desired oscillations. Capacitors 96 and 97 tune the tank circuit and were selected for one embodiment of the invention constructed in accordance with FIGURE 6 for an oscillator frequency in the order of 60 megacycles per second. To avoid restricting the movements of the person carrying the transmitter assembly of FIGURE 6, a rod type antenna shown generally at 99 as being connected to the collector of the transistor 92 may be utilized for radiating the bursts of radio frequency energy produce by the high frequency oscillations of the Colpitts oscillator circuit. The particular antenna arrangement of course would be varied in accordance with the particular application to which the system was being applied.

To further teach the present invention there is shown for purpose of illustration in FIGURE 7 in generalized form several signals occurring at various points in the receiver and demodulation system of FIGURES 2, 3, 4 and 5. In FIGURE 7 in the first or top waveform labeled as the PWRL input the pulses 24 which are applied to the pulse width recognition logic circuitry are shown. These pulses are spaced in time in accordance with the spacing of the pulses 16 generated by the voltage controlled pulse generator 12 in the transmitter. For purpose of illustration the pulses 24 are shown as being respectively separated from succeeding pulses by the different time intervals $t_1$, $t_2$, and $t_3$ to represent the variation in the separation of adjacent pulses caused by variations in the level of the voltage applied to the base of the transistor 80 in FIGURE 6. As indicated in FIGURE 3, the pulse width recognition logic serves to examine each of the pulses 24 and to provide a series of differentiated negative pulses 40 which correspond in time to the trailing edges of the pulses 24. As seen in FIGURE 4, each pulse 40 which is allowed to pass through the AND gate 50 serves to trigger the monostable multivibrator 51 to its unstable condition so that a negative signal 52 is applied to the inverting OR gate 53 causing the positive signal 54 to be generated in the output circuit of the inverting OR gate 53. As previously described, the two monostable multivibrators cause the signal 54 to exist for a constant interval of time identified in FIGURE 7 as the time interval $T_k$. The result is that between the termination of the signal 54 and the receipt of the next pulse 40 a negative going signal 28 exists for the time interval indicated as $T_1$. Thus it will be seen that the width of pulse 28 which exists for time $T_1$ is proportional to the time interval $t_1$ which as previously indicated is the time between two adjacent pulses generated by the voltage controlled pulse generator pulse 12. In a similar manner the succeeding pulses 28 exist for the time intervals $T_2$ and $T_3$. The net result is that a train of negative going pulses 28 which are pulse width modulated is produced. These width modulated pulses are applied to the detector system of FIGURE 5 and serve to trigger the monostable multivibrator 61 therein which opens the AND gate 63 for the time interval indicated in FIGURE 7 as being the time for the occurrence of the signal 66. It will be seen that the signals 28 thus pass through the AND gate 63 and are applied to the filter network 64. As is well known in the art, the filter network serves to provide an output signal the amplitude of which is proportional to the average of the level of the signals applied thereto.

In one system constructed in accordance with the teachings of the present invention using the components shown in FIGURE 6 and a sensor responsive to the heartbeat of a human being, the transmitter system was contained in a package occupying less than one tenth of a cubic inch of space and was therefore easily carried by the person under test. With the width of the pulses generated by the pulse generator 12 being two microseconds and a repetition rate of approximately 5,000 per second, and with the pulsed radio frequency oscillator operating at approximately 60 megacycles per second, the average power consumption of the transmitter system was approximately 50 microwatts and hence would operate continuously for between two and three weeks on a single aspirin-sized mercury cell having an output voltage of less than 2 volts.

There has thus been disclosed an improved communication system which includes a transmitter adapted to operate in a manner which conserves the energy of its power supply together with an improved receiver and demodulation system adapted to reduce the effects of noise and eliminate the need for transmission of separate timing pulses in a pulse communication system.

What is claimed is:

1. A communication system comprising in combination: a transmitter adapted to provide a substantially continuous train of position modulated pulses with a corresponding portion of each pulse separated in time from the immediately preceding pulse by a time interval proportional to the data to be transmitted; and a receiver adapted to receive said train of pulses and in response thereto to provide a series of output information signals each having a time duration proportional to the said time separation of corresponding portions of adjacent ones of said pulses.

2. A communication system in accordance with claim 1 wherein said transmitter includes a sensing element responsive to a selected condition and adapted to provide an electric signal having an amplitude proportional thereto, and signal amplitude responsive means coupled with said element adapted to periodically provide recurring bursts of radio frequency signals for a predetermined constant time with the time between each adjacent ones of said bursts of signals being proportional to the amplitude of said electric signals.

3. A communication system in accordance with claim 2 wherein said signal amplitude responsive means includes a voltage controlled astable multivibrator adapted to be in a first condition only for said constant time, and a radio frequency oscillator coupled with said multivibrator and adapted to provide output signals only when said multivibrator is in its said first condition.

4. A communication system in accordance with claim 1 wherein said receiver includes means responsive to the receipt of each of said pulses to generate a constant time duration signal which terminates prior to receipt of the next pulse, said information signals corresponding in duration of time to the time between termination of one of said constant time duration signals and the initiation of a subsequent one of said constant time duration signals.

5. A communication receiving system adapted to receive a series of information signals each separated from a preceding signal by a time interval proportional to the transmitted intelligence, comprising in combination: signal generating means responsive to each of said information signals for generating a constant signal having a predetermined time duration; and signal output means coupled with said generating means adapted to provide output signals each of which is initiated by termination of one of said constant signals and each of which terminates upon initiation of a subsequent one of said constant signals.

6. A receiving system in accordance with claim 5 and including signal gating means coupled to the input and to the output of said signal generating means and adapted to prevent the application of an information signal to said generating means during the existence of one of said constant signals.

7. A communication receiving system for providing width modulated output signals in response to a train of time position modulated information signals comprising: pulse width recognition means adapted to provide a first signal only in response to an applied information signal having a time duration substantially equal to a first predetermined time interval; and output signal generating means coupled with said recognition means and operative to provide a first output signal having a second constant time duration in response to the receipt of each said first signal and to provide a second output signal having a time duration equal to the time between termination of one of said first output signals and the initiation of the next subsequent one of said first output signals.

8. A system in accordance with claim 7 and including gate means coupled with said signal generating means adapted to prevent the application of signals thereto during the occurrence of a said first output signal.

9. A system in accordance with claim 7 wherein said signal generating means comprises: monostable circuit means having a first stable condition and responsive to an applied one of said first signals to change to a second unstable condition for said second constant time duration and to then revert to its said first stable condition; signal output circuit means coupled with said monostable circuit means and adapted to prevent the application of a said first signal thereto when said monostable circuit means is in its said unstable condition.

10. A system in accordance with claim 9 wherein said signal output circuit means includes means operable to terminate said second output signal after a third constant time interval.

11. A system in accordance with claim 9 wherein said control means includes an AND gate connected to said monostable circuit means and having first and second input circuits respectively connected to said signal output circuit means and to said recognition means.

12. A signal receiving and demodulating system adapted to provide pulse width modulated output signals in response to a series of constant width input signals each of which is separated from a preceding input signal by a time which is proportional to the intelligence to be transmitted, comprising in combination: signal reconstruction means including first circuit means having a first condition and responsive to a first one of said input signals to assume a second condition for a predetermined constant time interval which is shorter than the minimum expected time separation between two adjacent ones of said input signals, and to then revert to its said first condition until a subsequent input signal is applied thereto; signal gating means coupled with said first circuit means adapted to permit the application of an input signal thereto only when said first circuit means is in its said first condition; second circuit means coupled with said first circuit means and adapted to change from a first condition to a second condition in response to said first circuit means changing from its said second to its said first condition, said second circuit means being adapted to remain in its said second condition for a second constant time interval and to then revert to its said first condition; and signal output gating means coupled with each of said circuit means and adapted to provide an output signal only when said first circuit means is in its said first condition and said second circuit means is in its said second condition.

13. A system in accordance with claim 12 wherein each of said first and second circuit means includes a monostable circuit with the stable condition of each monostable circuit corresponding respectively to said first conditions.

14. A system in accordance with claim 12 wherein said second constant time interval is longer than the longest time interval said first circuit means remains in its said first condition when each successive input signal is applied thereto.

References Cited

UNITED STATES PATENTS

| | | | |
|---|---|---|---|
| 2,434,894 | 1/1948 | Ambrose | 332—1 X |
| 2,482,782 | 9/1949 | Lenny et al. | 328—109 |
| 2,534,535 | 12/1950 | Smith et al. | 325—143 X |
| 3,032,742 | 5/1962 | Calkins | 332—9 X |

JOHN W. CALDWELL, *Primary Examiner.*

J. T. STRATMAN, *Assistant Examiner.*